(12) United States Patent
Murayama (10) Patent No.: US 10,298,063 B2
(45) Date of Patent: May 21, 2019

(54) POWER-SUPPLYING DEVICE AND WIRELESS POWER SUPPLY SYSTEM

(71) Applicant: IHI Corporation, Tokyo (JP)

(72) Inventor: Takahiko Murayama, Tokyo (JP)

(73) Assignee: IHI Corporation, Tokyo (JP)

(*) Notice: Subject to any disclaimer, the term of this patent is extended or adjusted under 35 U.S.C. 154(b) by 972 days.

(21) Appl. No.: 14/805,729

(22) Filed: Jul. 22, 2015

(65) Prior Publication Data

US 2015/0326035 A1 Nov. 12, 2015

Related U.S. Application Data

(63) Continuation of application No. PCT/JP2014/053099, filed on Feb. 10, 2014.

(30) Foreign Application Priority Data

Mar. 18, 2013 (JP) .................. 2013-055046

(51) Int. Cl.
| | | |
|---|---|---|
| *H02J 50/12* | (2016.01) | |
| *H02J 7/02* | (2016.01) | |
| *H02J 5/00* | (2016.01) | |
| *H02J 50/80* | (2016.01) | |
| *H02J 7/00* | (2006.01) | |

(52) U.S. Cl.
CPC .............. *H02J 50/12* (2016.02); *H02J 5/005* (2013.01); *H02J 7/0016* (2013.01); *H02J 7/025* (2013.01); *H02J 50/80* (2016.02)

(58) Field of Classification Search
CPC ............. H02J 7/025; H02J 5/005; H02J 50/12
See application file for complete search history.

(56) References Cited

U.S. PATENT DOCUMENTS

| | | |
|---|---|---|
| 8,129,864 B2 | 3/2012 | Baarman et al. |
| 8,829,725 B2 | 9/2014 | Urano |
| 2009/0174263 A1 | 7/2009 | Baarman et al. |

(Continued)

FOREIGN PATENT DOCUMENTS

| | | |
|---|---|---|
| CN | 101958649 A | 1/2011 |
| CN | 101965671 A | 2/2011 |

(Continued)

OTHER PUBLICATIONS

JP2013-005614A (English Translation), 2013.*

(Continued)

*Primary Examiner* — Alfonso Perez Borroto
(74) *Attorney, Agent, or Firm* — Volpe and Koenig, P.C.

(57) ABSTRACT

A wireless power supply device and a wireless power supply system of the present disclosure include a rectifier circuit to be connected to a commercial power source, a conversion unit which is connected to the rectifier circuit, a resonance circuit which is connected to the conversion unit and transmits power toward a power-receiving device wirelessly, a communication unit which receives, from the power-receiving device, information relating to power supply to a load supplied with power, and a control unit which is connected to the communication unit and the conversion unit and controls the conversion unit based on the information so that the value of power supply impedance of the load falls within a predetermined range.

14 Claims, 4 Drawing Sheets

(56) References Cited

U.S. PATENT DOCUMENTS

| | | | |
|---|---|---|---|
| 2010/0109443 A1* | 5/2010 | Cook | H01Q 1/2225 307/104 |
| 2011/0109263 A1 | 5/2011 | Sakoda et al. | |
| 2011/0227420 A1 | 9/2011 | Urano | |
| 2012/0242284 A1 | 9/2012 | Wheatley, III et al. | |
| 2013/0033118 A1 | 2/2013 | Karalis et al. | |
| 2013/0293192 A1 | 11/2013 | Abe et al. | |
| 2013/0313893 A1 | 11/2013 | Ichikawa | |

FOREIGN PATENT DOCUMENTS

| | | |
|---|---|---|
| CN | 102195366 A | 9/2011 |
| CN | 202231500 U | 5/2012 |
| EP | 2367263 A2 | 9/2011 |
| JP | 2011-120443 A | 6/2011 |
| JP | 2011-147271 A | 7/2011 |
| JP | 2012-070463 A | 4/2012 |
| JP | 2012-135117 A | 7/2012 |
| JP | 2013-005614 A | 1/2013 |
| JP | 2013-215066 A | 10/2013 |
| WO | 2012/093423 A1 | 7/2012 |
| WO | 2012/099169 A1 | 7/2012 |
| WO | 2012/111085 A1 | 8/2012 |
| WO | 2012/172410 A1 | 12/2012 |

OTHER PUBLICATIONS

Japanese Office Action with English concise explanation, Japanese Patent Application No. 2015-506644, dated Oct. 6, 2015, 6 pgs.
International Search Report, PCT/JP2014/053099, dated Mar. 11, 2014, 2 pgs.

\* cited by examiner

POWER-SUPPLYING DEVICE AND WIRELESS POWER SUPPLY SYSTEM

The present disclosure relates to a power-supplying device and a wireless power supply system.

This application is a continuation application based on a PCT Patent Application No. PCT/JP2014/053099, filed on Feb. 10, 2014, whose priority is claimed on Japanese Patent Application No. 2013-055046, filed on Mar. 18, 2013. The contents of both the PCT application and the Japanese Patent Application are incorporated herein by reference.

TECHNICAL FIELD

Background Art

As a method of wirelessly transmitting power using magnetic coupling of two coils, an electromagnetic induction method and a magnetic field resonance method have become known. In the electromagnetic induction method, power is wirelessly transmitted by means of electromagnetic induction between a power-supplying-side coil and a power-receiving-side coil. In the magnetic field resonance method, a power-supplying-side resonator is constituted by equipping a power-supplying-side coil with a capacitor, and also a power-receiving-side resonator is constituted by equipping a power-receiving-side coil with a capacitor, so that electric power is transmitted between these two resonators. For example, in Patent Document 1 shown below, a power-supplying device, a power-receiving device, and a wireless power supply system using such a magnetic field resonance method is disclosed.

DOCUMENT OF RELATED ART

Patent Document

[Patent Document 1]
 Japanese Unexamined Patent Application, First Publication No. 2011-147271

SUMMARY

Technical Problem

The magnetic field resonance method has higher performance, such as high power transmission efficiency, a capability of long-distance transmission, and so on, than the electromagnetic induction method, but it is necessary to improve not only power transmission efficiency but also the power efficiency of an overall system. In particular, in a system (wireless power supply system) that wirelessly supplies relatively high power from a power-supplying device to a power-receiving device, such as wireless power supply to, for example, an electric vehicle, the handled power is relatively high, and thus it is necessary to improve the overall power efficiency of the power-supplying device and the power-receiving device.

Solution to Problem

In order to achieve the aforementioned object, a wireless power supply device of the present disclosure includes: a rectifier circuit to be connected to a commercial power source; a conversion unit which is connected to the rectifier circuit; a resonance circuit which is connected to the conversion unit and wirelessly transmits power to a power-receiving device; a communication unit which receives, from the power-receiving device, information relating to power supply to a load supplied with power; and a control unit which is connected to the communication unit and the conversion unit, and controls the conversion unit based on the information so that a value of power supply impedance of the load falls within a predetermined range. According to the wireless power supply device of the present disclosure, the power-supplying device controls the power supply impedance of the load as described above, so that the overall power efficiency of the power-supplying device and the power-receiving device is improved.

Effects of the Disclosure

According to the present disclosure, it is possible to supply power to a load in a power-receiving device with high efficiency, so that the overall power efficiency of a wireless power supply system can be improved.

Also, according to the present disclosure, a power-supplying device adjusts power supply to the load in the power-receiving device, and thus it is unnecessary to provide the power-receiving device with a function unit which adjusts power supplied to the load, for example, a charging circuit for a battery (secondary battery) as the load. Accordingly, the overall power efficiency of a wireless power supply system can also be improved.

DESCRIPTION OF EMBODIMENTS

Hereinafter, an embodiment of the present disclosure will be described with reference to the drawings.

Figure 1:
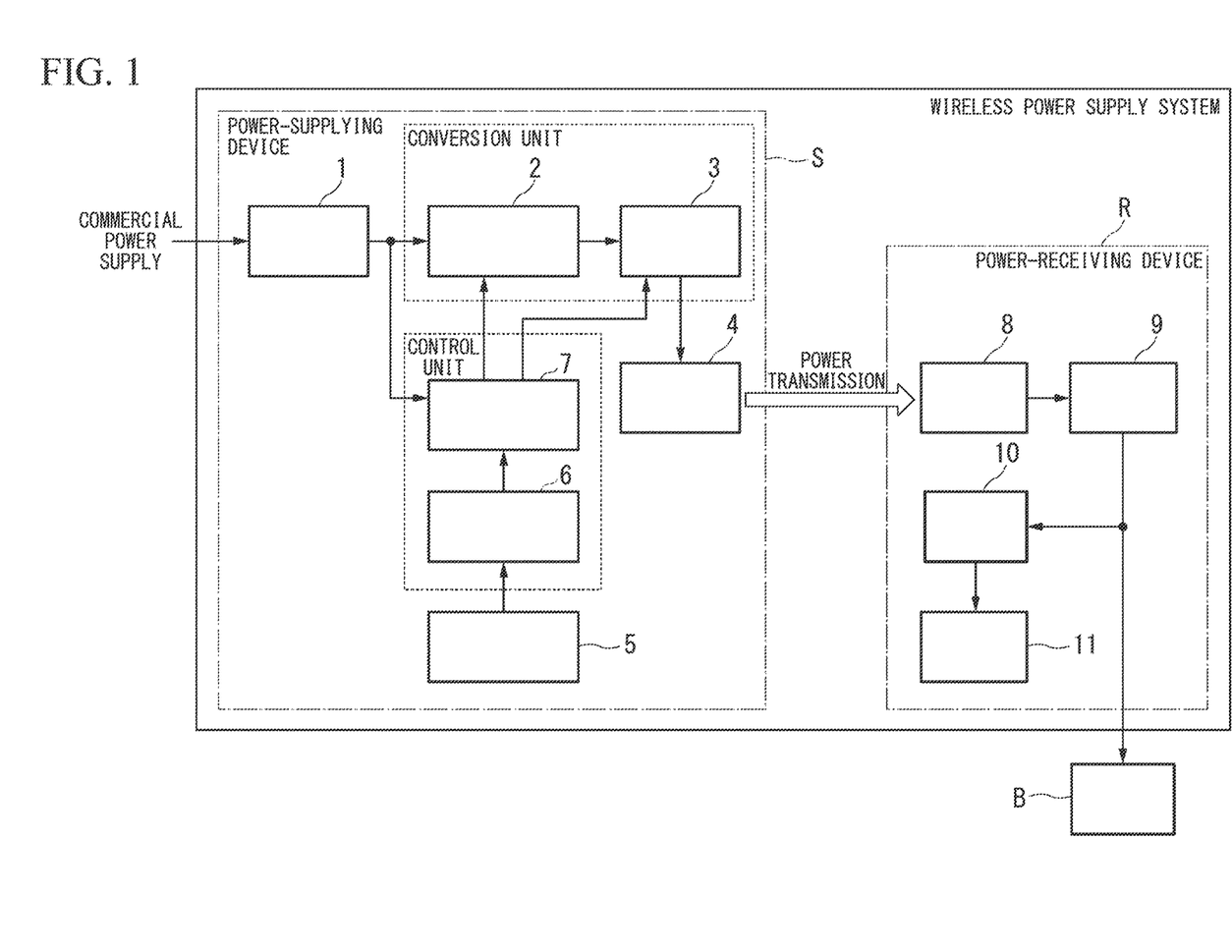
FIG. 1 is a block diagram showing a functional constitution of a power-supplying device and a wireless power supply system relating to an embodiment of the present disclosure.

As shown in FIG. 1, a wireless power supply system relating to this embodiment includes a power-supplying device S and a power-receiving device R. Also, as shown in the drawing, the power-supplying device S includes a rectifier circuit 1, a chopper circuit (conversion unit) 2, an inverter circuit (conversion unit) 3, a resonance circuit 4, a communication unit (communication device) 5, an impedance calculation unit 6, and a switching control unit 7. Here, the impedance calculation unit 6 and the switching control unit 7 constitute a control unit (controller). As will be described below, the impedance calculation unit 6 may be omitted. In this case, necessary calculations are performed on the power-receiving device side. Meanwhile, the power-receiving device R includes a resonance circuit 8, a rectifier circuit 9, a measurement unit (sensor) 10, and a communication unit 11.

The power-supplying device S is a device fixedly disposed in a power-supplying facility provided on the ground and wirelessly supplying alternating current (AC) power to a mobile object, and direct current (DC) power is supplied to a battery B (load). The power-supplying facility is a facility in which a stop space or a plurality of stop spaces for mobile objects are provided, and has as many power-supplying devices S as the number of stop spaces. Meanwhile, the power-receiving device R is a device provided in the mobile object to convert the AC power supplied from the power-supplying device S into DC power and store the DC power. Here, the mobile object is a vehicle, such as an electric vehicle or a hybrid vehicle which needs to receive power (electric power) from the outside.

The rectifier circuit 1 in the power-supplying device S is, for example, a diode bridge, which full-wave rectifies commercial power (e.g., single-phase 100 volts, 50 Hz) supplied from an external commercial power source and outputs the full-wave rectified power to the chopper circuit 2. The power (full-wave rectified power) supplied from the rectifier circuit 1 to the chopper circuit 2 is a monopolar (e.g., positive polarity) pulsating current obtained when the commercial power of a sine wave is turned up at the zero cross point.

A switching operation of the chopper circuit 2 is controlled by the switching control unit 7, so that the chopper circuit 2 adjusts its own output voltage and outputs the adjusted output voltage to the inverter circuit 3. The output of the chopper circuit 2 is DC power obtained when the full-wave rectified power which is the pulsating current is sufficiently smoothed by functions of an inductor (choke coil) and a smoothing capacitor in the chopper circuit 2.

In other words, the chopper circuit 2 outputs, to the inverter circuit 3, a voltage that is adjusted so that a power supply impedance Zout (=load impedance) when the DC power is supplied from the rectifier circuit 9 of the power-receiving device R to the battery B (load) falls within an allowable impedance Zr of a certain range defined between a lower limit value Zmin and an upper limit value Zmax. The allowable impedance Zr is an impedance set in advance so that power-supplying efficiency (charging efficiency) from the rectifier circuit 9 to the battery B becomes favorable, and is, for example, 20 to 45 Ω.

In addition, the switching operation of the chopper circuit 2 is controlled by the switching control unit 7, so that the chopper circuit 2 functions as a power factor correction (PFC) circuit as well. In other words, by switching the full-wave rectified power at a frequency sufficiently higher than the frequency of the full-wave rectified power based on the zero cross point of the full-wave rectified power, the chopper circuit 2 extends the conduction interval of the current of the full-wave rectified power to improve a power factor. It is generally well known that a chopper circuit functions as a PFC circuit, and thus a detailed description of a power factor correction principle of the chopper circuit 2 is omitted herein.

A switching operation of the inverter circuit 3 is controlled by the switching control unit 7, so that the inverter circuit 3 converts the DC power supplied from the chopper circuit 2 into AC power of a predetermined frequency (transmission frequency f) and outputs the AC power to the resonance circuit 4. The transmission frequency f is acquired in advance as a value at which efficiency of power transmission between the resonance circuit 4 and the resonance circuit 8 becomes favorable at a time of design study for the wireless power supply system. Alternatively, the frequency f may be variable so that the efficiency of power transmission becomes a desired transmission efficiency.

The resonance circuit 4 is a resonance circuit in which a power-supplying coil and a power-supplying capacitor are connected. Between the power-supplying coil and the power-supplying capacitor, the power-supplying coil is provided at a position corresponding to a predetermined point of the mobile object (point at which a power-receiving coil has been provided) stopping at the stop space. Also, the resonance frequency of the resonance circuit 4 has been set to a frequency which is close to the transmission frequency f in the inverter circuit 3.

By performing short-range wireless communication with the communication unit 11 of the power-receiving device R, the communication unit 5 acquires charging information from the communication unit 11. The charging information is information (information relating to power supply to a load) representing a power supply state of the DC power supplied from the rectifier circuit 9 to the load, for example, the battery B, and specific examples are a voltage and a current relating to the load. When the load is a battery, the information is, for example, a supplied voltage (charging voltage Vj) and a supplied current (charging current Ij). It is possible to use a variety of information depending on the type of the load, and interpretations of information are not limited to these examples. Such a communication unit 5 outputs the information acquired from the communication unit 11 to the control unit. Specifically, the communication unit 5 outputs the information to the impedance calculation unit 6 included in the control unit. Here, a communication method between the communication unit 5 and the communication unit 11 is short-range wireless communication, such as ZigBee (registered trademark) or Bluetooth (registered trademark), or short-range wireless communication using an optical signal.

When the load is assumed to be a battery as an example in order to facilitate understanding, the impedance calculation unit 6 calculates the power supply impedance Zout (=load impedance) based on the charging voltage Vj and the charging current Ij input from the communication unit 5, and outputs the calculation result to the switching control unit 7. In other words, the impedance calculation unit 6 acquires the power supply impedance Zout (=load impedance) by dividing the charging voltage Vj by the charging current Ij, and outputs the power supply impedance Zout to the switching control unit 7.

The switching control unit 7 controls the chopper circuit 2 and the inverter circuit 3 based on the full-wave rectified power input from the rectifier circuit 1 and the power supply impedance Zout input from the impedance calculation unit 6. In other words, based on the full-wave rectified power, the switching control unit 7 generates a switching signal (pulse signal for a chopper circuit) which has an integer multiple (when commercial power is 50 Hz, 100 Hz which is twice the commercial power) of a repetition frequency of the full-wave rectified power and also is phase-synchronized at the zero cross point of the full-wave rectified power, and outputs the switching signal to the chopper circuit 2, thereby causing the chopper circuit to function as a PFC circuit.

Also, the switching control unit 7 adjusts the duty ratio of the pulse signal for a chopper circuit by setting the duty ratio so that the power supply impedance Zout falls within the aforementioned allowable impedance Zr, and adjusts the output voltage of the chopper circuit 2. The switching control unit 7 obtains, for example, a difference between the power supply impedance Zout and the allowable impedance Zr, and sets the duty ratio of the pulse signal for a chopper circuit based on the difference. Here, it is well known that the output voltage of a chopper circuit can be changed by adjusting the duty ratio of a switching signal.

Further, the switching control unit 7 sets and adjusts the duty ratio and/or a phase difference between respective phases so that the power supply impedance Zout falls within the aforementioned allowable impedance Zr. Then, the switching control unit 7 generates a switching signal (pulse signal for an inverter) whose duty ratio and/or phase difference between respective phases has been adjusted and outputs the switching signal to the inverter circuit 3, thereby adjusting the output voltage of the inverter circuit 3.

For example, the switching control unit 7 obtains a difference between the power supply impedance Zout and the allowable impedance Zr, and sets the duty ratio of the pulse signal for an inverter and/or a phase difference between respective phases based on the difference. Here, it is well known that the output voltage of an inverter circuit can be changed by adjusting the duty ratio of a switching signal or a phase difference between respective phases. The impedance calculation unit 6 and the switching control unit 7 constitute the control unit in this embodiment.

Meanwhile, the resonance circuit 8 of the power-receiving device R is a resonance circuit in which the power-receiving coil and a power-receiving capacitor are connected. The power-receiving coil is provided in the bottom, a side portion, an upper portion, or the like of the mobile object, and comes close to and opposite to the power-supplying coil of the power-supplying device S when the mobile object stops at a stop space.

The power-receiving coil of such a resonance circuit 8 comes close to and opposite to the power-supplying coil of the resonance circuit 4 and is magnetically coupled with the power-supplying coil. As a result of the magnetic coupling, the resonance circuit 8 wirelessly receives AC power, which is based on the AC power supplied to the power-supplying coil by the inverter circuit 3 and a coupling coefficient between the power-supplying coil and the power-receiving coil, from the resonance circuit 4 and outputs the AC power to the rectifier circuit 9. In other words, this wireless power supply system is a wireless power supply system based on the magnetic field resonance method.

The rectifier circuit 9 includes, for example, a diode bridge, a reactor, and a smoothing capacitor. The rectifier circuit 9 full-wave rectifies and also smooths the AC power (received power) supplied from the resonance circuit 8, and outputs the resultant power to the battery B. The power supplied from the rectifier circuit 9 to the battery B is DC power obtained by smoothing the full-wave rectified power, which is full-wave rectified by the diode bridge, through the reactor and the smoothing capacitor.

The measurement unit 10 measures the amount of electricity, that is, the charging voltage Vj and the charging current Ij, representing a state of power supply from the rectifier circuit 9 to the battery B, and outputs the measured amount of electricity to the communication unit 11 as the charging information. The communication unit 11 wirelessly transmits the charging information to the communication unit 5 of the power-supplying device S. In other words, the communication unit 11 performs short-range wireless communication with the communication unit 5 and, like the communication unit 5, performs radio wave communication, such as ZigBee (registered trademark) or Bluetooth (registered trademark), or optical communication using an optical signal.

The battery B, which is an example of a load, is a secondary battery, such as a lithium ion battery, and is charged with and stores the DC power supplied from the rectifier circuit 9. Although not shown in the drawing, the battery B is connected to an inverter (inverter for traveling) which operates a motor for traveling of the mobile object and/or control equipment which controls travelling of the mobile object, and supplies drive power to the inverter for traveling or the control equipment.

Next, operation of the power-supplying device and the wireless power supply system constituted in this way will be described in detail with reference to FIG. 2 to FIG. 4.

When the mobile object enters a stop space, the wireless power supply system starts power supply to the mobile object. For example, the communication unit 5 of the power-supplying device S continuously sends a communication request signal at regular intervals. Meanwhile, when the mobile object enters a stop space, the communication unit 11 of the power-receiving device R is able to receive the communication request signal, and thus transmits an answer signal to the communication unit 5 in response to the communication request signal. When the answer signal is received, the communication unit 5 notifies the switching control unit 7 of reception of the answer signal through the impedance calculation unit 6. As a result of the notification, the switching control unit 7 determines (recognizes) that a mobile object has entered an area in which it is possible to supply power.

When the switching control unit 7 determines that a mobile object has entered the area in which it is possible to supply power, the communication unit 5 transmits a transmission request of information relating to power supply to a load, for example, charging information, to the communication unit 11, and acquires the charging voltage Vj and the charging current Ij. In other words, when the transmission request is received, the communication unit 11 obtains the charging voltage Vj and the charging current Ij from the measurement unit 10 and transmits the charging voltage Vj and the charging current Ij to the communication unit 5. Then, the communication unit 5 provides the charging voltage Vj and the charging current Ij received from the communication unit 11 to the impedance calculation unit 6. The impedance calculation unit 6 calculates the power supply impedance Zout by dividing the charging voltage Vj by the charging current Ij, and outputs the power supply impedance Zout to the switching control unit 7.

When the power-supplying device S supplies power to the power-receiving device R, the switching control unit 7 starts generation of a pulse signal for a chopper circuit and a pulse signal for an inverter, thereby starting power transmission from the power-supplying coil to the power-receiving coil. In other words, upon detecting the zero cross point of the full-wave rectified power input from the rectifier circuit 1, the switching control unit 7 outputs the zero cross point, a repetition frequency set based on the inductance value of the reactor (choke coil) in the chopper circuit 2, and a pulse signal for a chopper circuit having a duty ratio which is set so that the output voltage of the chopper circuit 2 becomes a desired value.

Then, the switching control unit 7 sets the repetition frequency of the pulse signal for a chopper circuit to an integer multiple (e.g., 100 times) of the repetition frequency of the full-wave rectified power based on the zero cross point and the repetition frequency of the full-wave rectified power, and synchronizes the phase of the pulse signal for a chopper circuit with the zero cross point of the full-wave rectified power.

Also, the switching control unit 7 sets the duty ratio of the pulse signal for a chopper circuit so that the power supply impedance Zout input from the impedance calculation unit 6 falls within the allowable impedance Zr. In this way, the switching control unit 7 adjusts the duty ratio, thereby adjusting the output voltage of the chopper circuit 2.

In other words, the switching control unit 7 sets the phase of the pulse signal for a chopper circuit among the repetition frequency, the phase, and the duty ratio which are attribute values of the pulse signal for a chopper circuit so that the chopper circuit 2 functions as a PFC circuit, and also sets the duty ratio of the pulse signal for a chopper circuit so that the power supply impedance Zout of the rectifier circuit 9 falls within the allowable impedance Zr. That is, the chopper circuit 2 in this embodiment functions as a PFC circuit and also functions as an impedance adjuster which sets the power supply impedance Zout of the rectifier circuit 9 to fall within the allowable impedance Zr.

Further, the switching control unit 7 sets the duty ratio of an inverter circuit pulse signal and/or a phase difference between respective phases among a repetition frequency, a phase, and the duty ratio which are attribute values of the inverter circuit pulse signal so that the power supply impedance Zout falls within the allowable impedance Zr. In this way, the switching control unit 7 adjusts the duty ratio and/or a phase difference between respective phases, thereby adjusting the output voltage of the inverter circuit 3. That is, the inverter circuit 3 in this embodiment functions as an impedance adjuster which sets the power supply impedance Zout of the rectifier circuit 9 to fall within the allowable impedance Zr.

When wireless power transmission from the power-supplying coil (power-supplying device S) to the power-receiving coil (power-receiving device R) is started by generating the pulse signal for a chopper circuit and the pulse signal for an inverter in this way, the switching control unit 7 outputs an acquisition request for information (charging information (the charging voltage Vj and the charging current Ij)) relating to power supply to a load to the communication unit 5 at predetermined time intervals. Then, the communication unit 5 receives the information (the charging information (the charging voltage Vj and the charging current Ij)) relating to power supply to a load from the communication unit 11 at the predetermined time intervals, and sequentially outputs the received information to the impedance calculation unit 6. Accordingly, the power supply impedance Zout is sequentially input from the impedance calculation unit 6 to the switching control unit 7.

Also, the switching control unit 7 sequentially sets the duty ratio of the pulse signal for a chopper circuit, the duty ratio of the inverter circuit pulse signal, and a phase difference between respective phases based on the power supply impedance Zout sequentially input from the impedance calculation unit 6. Accordingly, when the load is a battery, the power supply impedance Zout falls within the allowable impedance Zr during a charging period from the start of power supply to the battery B whose state of charge (SOC: charging rate) is low to the end of power supply to the battery B whose SOC is high, and highly efficient charging thus becomes possible during the charging period.

Figure 2:
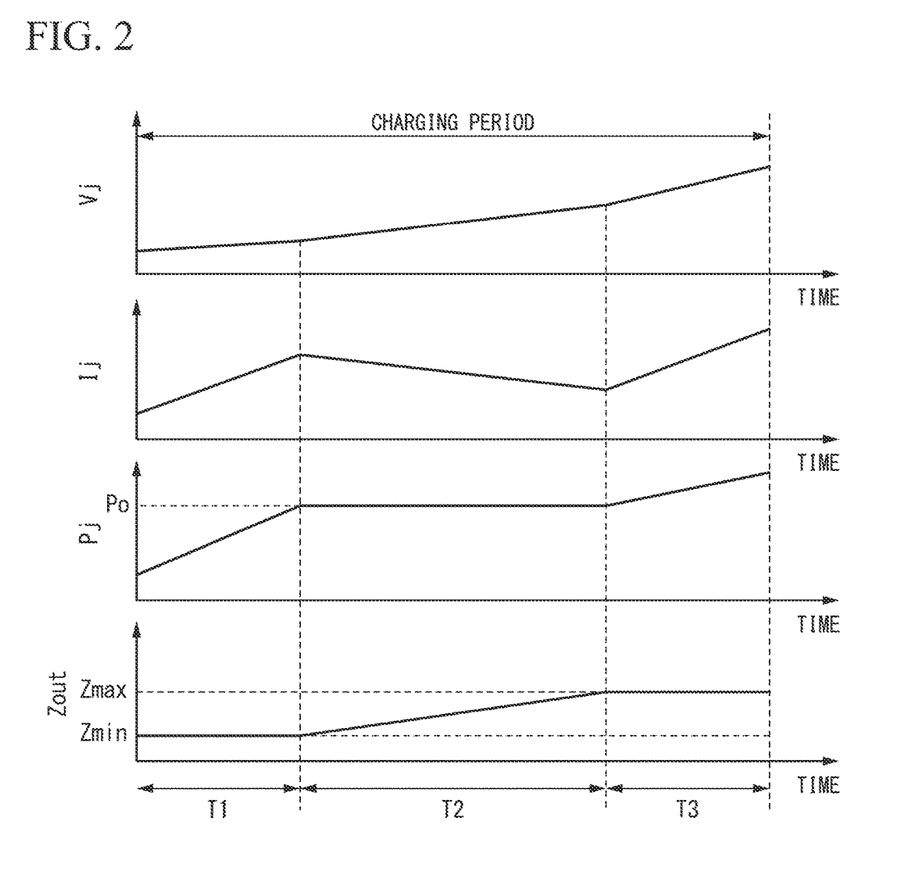
FIG. 2 is a first characteristic diagram showing operation of a power-supplying device and a wireless power supply system relating to an embodiment of the present disclosure.

FIG. 2 is an operation diagram when such control (power supply impedance control) of setting the power supply impedance Zout to fall within the allowable impedance Zr is combined with constant power control of sequentially supplying constant power from the rectifier circuit 9 to the battery B between the start of charging to the end of charging, showing temporal variations of the charging voltage Vj, the charging current Ij, charging power Pj, and the power supply impedance Zout during the charging period.

In this characteristic diagram, a period T1 is a control period in which power supply impedance control functions with priority over constant power control and thus the power supply impedance Zout becomes identical to the lower limit value Zmin of the allowable impedance Zr. In other words, in this period T1, since the SOC of the battery B is relatively small, the charging voltage Vj is relatively low, and the charging current Ij is adjusted so that the power supply impedance Zout does not become smaller than the lower limit value Zmin.

A period T2 is a control period in which constant power control and power supply impedance control both function, so that the charging power Po is maintained at target power Po and also the power supply impedance Zout changes from the lower limit value Zmin toward the upper limit value Zmax. In the period T2, since the SOC of the battery B increases to certain degree, the charging current Ij is adjusted to change the power supply impedance Zout from the lower limit value Zmin toward the upper limit value Zmax, and also to maintain the charging power Pj at the target power Po.

A period T3 is a control period in which power supply impedance control functions with priority over constant power control and thus the power supply impedance Zout becomes identical to the upper limit value Zmax. In other words, in this period T3, since the SOC of the battery B is relatively large, the charging voltage Vj is relatively high, and the charging current Ij is adjusted so that the power supply impedance Zout does not exceed the upper limit value Zmax.

Figure 3:
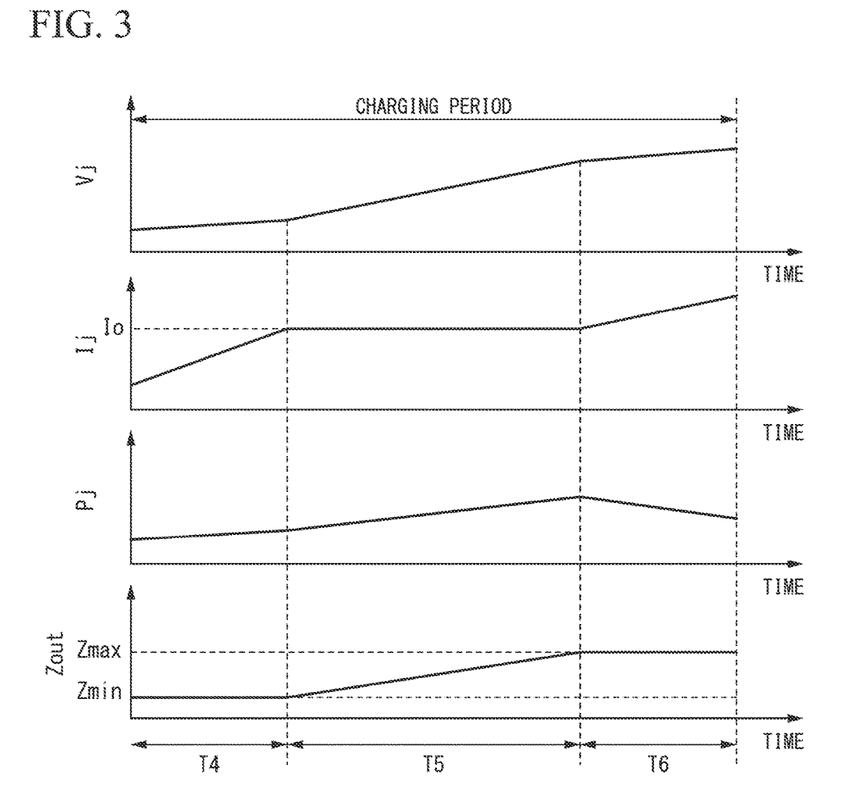
FIG. 3 is a second characteristic diagram showing operation of a power-supplying device and a wireless power supply system relating to a variation of the present disclosure.
Figure 4:
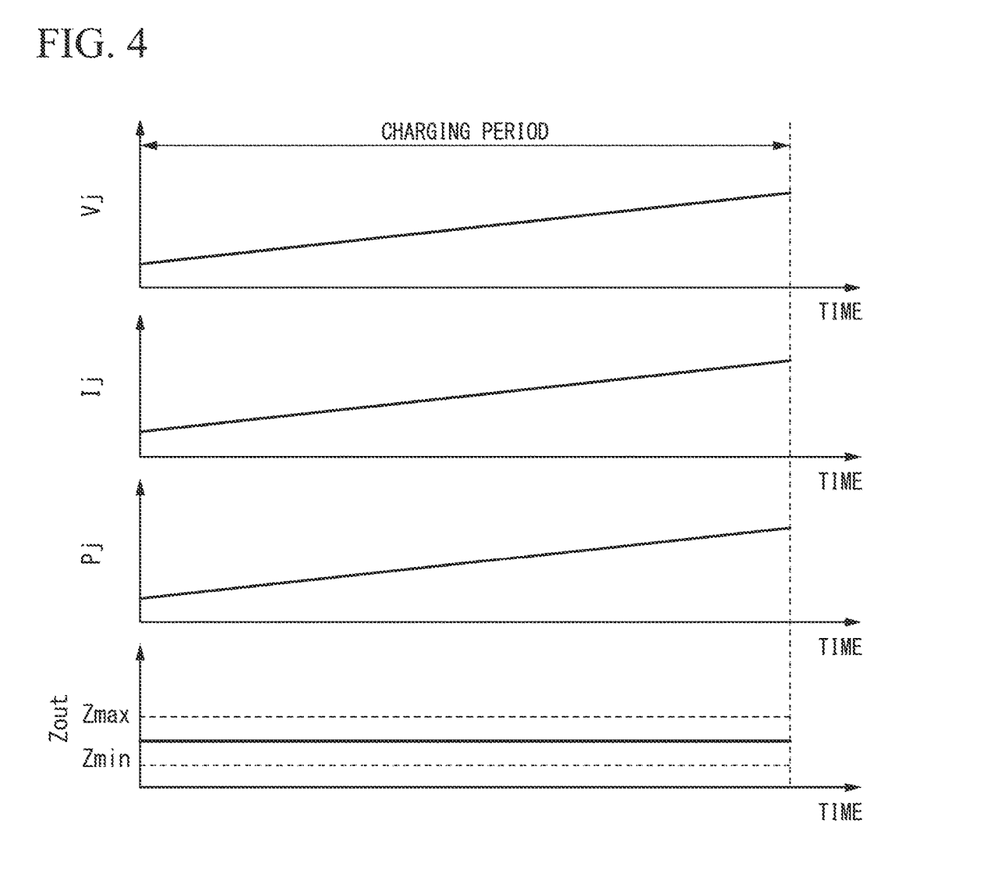
FIG. 4 is a third characteristic diagram showing operation of a power-supplying device and a wireless power supply system relating to a variation of the present disclosure.

Meanwhile, FIG. 3 is an operation diagram when the power supply impedance control is combined with constant current control of sequentially supplying a constant current from the rectifier circuit 9 to the battery B between the start of charging to the end of charging, showing temporal variations of the charging voltage Vj, the charging current Ij, the charging power Pj, and the power supply impedance Zout during the charging period.

In this characteristic diagram, a period T4 is a control period in which power supply impedance control functions with priority over constant current control and thus the power supply impedance Zout becomes identical to the lower limit value Zmin. In other words, in this period T4, since the SOC of the battery B is relatively small, the charging voltage Vj is relatively low, and the charging current Ij is adjusted so that the power supply impedance Zout does not become smaller than the lower limit value Zmin.

A period T5 is a control period in which constant current control and power supply impedance control both function, so that the charging current Ij is maintained at a target current Io and also the power supply impedance Zout changes from the lower limit value Zmin toward the upper limit value Zmax. In the period T5, since the SOC of the battery B increases to certain degree, the charging current Ij is maintained at the target current Io, so that the power supply impedance Zout changes from the lower limit value Zmin toward the upper limit value Zmax.

A period T6 is a control period in which power supply impedance control functions with priority over constant current control and thus the power supply impedance Zout becomes identical to the upper limit value Zmax. In other words, in this period T6, since the SOC of the battery B is relatively large, the charging voltage Vj is relatively high, and the charging current Ij is adjusted so that the power supply impedance Zout does not exceed the upper limit value Zmax.

According to the embodiment described above, since the power supply impedance Zout is controlled to fall within the allowable impedance Zr in the charging period of the battery B, it is possible to minimize power loss in charging the battery B by the rectifier circuit 9 during the charging period, and thus the overall power efficiency of the wireless power supply system can be improved more than before.

Also, according to this embodiment, it is unnecessary to provide the power-receiving device R with a charging circuit which adjusts a charging current for the battery B, and accordingly, the overall power efficiency of the wireless power supply system can also be improved more than before.

In addition, the present disclosure is not limited to the embodiment, and it is possible to consider, for example, the following variations.

(1) In the embodiment, a case in which the power-supplying device S acquires charging information including the charging voltage Vj and the charging current Ij as information representing a power supply state has been described, but the present disclosure is not limited to this case. For example, the measurement unit 10 may be provided with the same calculation function as the impedance calculation unit 6, so that the power supply impedance Zout calculated by the measurement unit 10 may be transmitted from the communication unit 11 to the communication unit 5.

(2) In the embodiment, the allowable impedance Zr has been set as a value in a predetermined range defined by the lower limit value Zmin and the upper limit value Zmax, but the present disclosure is not limited to such a value. The allowable impedance Zr may be set as a constant value, which does not have a numerical range. FIG. 4 is a characteristic diagram showing temporal variations of the charging voltage Vj, the charging current Ij, the charging power Pj, and the power supply impedance Zout in this case. In other words, in this case, since the allowable impedance Zr is maintained at a constant value, which does not have a numerical range, it is not possible to combine the constant power control or the constant current control with the power supply impedance control, and the charging current Ij and the charging power Pj increase in sequence according to an increase in the charging voltage Vj resulting from an increase in the SOC of the battery B.

(3) In the embodiment, the chopper circuit 2 and the inverter circuit 3 are given the function of an impedance adjuster, but the present disclosure is not limited to this case. Any one of the chopper circuit 2 and the inverter circuit 3 may be given the function of an impedance adjuster. Also, in the embodiment, the chopper circuit 2 is given the function of correcting power factor of the rectifier circuit 1, but this power factor correction function may be omitted.

(4) In the embodiment, a wireless power supply system based on the magnetic field resonance method has been described, but the present disclosure is not limited to this wireless power supply system based on the magnetic field resonance method. The present disclosure can be applied to the electromagnetic induction method as well. Also, in the embodiment, the battery B has been set as a load, but a load in the present disclosure is not limited to the battery and includes a variety of storage devices and various types of equipment which are supplied with power to implement predetermined functions.

INDUSTRIAL APPLICABILITY

The present disclosure is intended to improve the overall power efficiency of a wireless power supply system.

The invention claimed is:
1. A wireless power supply device comprising:
a rectifier circuit to be connected to a commercial power source;
a conversion unit which is connected to the rectifier circuit;
a resonance circuit which is connected to the conversion unit and transmits power toward a power-receiving device wirelessly;
a communication unit which receives, from the power-receiving device, information relating to power supply to a load supplied with power; and
a control unit which is connected to the communication unit and the conversion unit, and controls, in accordance with an order of a first control period in which a power supply impedance control functions with priority over a constant power control, a second control period in which the power supply impedance control and the constant power control both function, and a third control period in which the power supply impedance control functions with priority over the constant power control, the conversion unit based on the information such that a value of power supply impedance of the load falls within a predetermined range.
2. The wireless power supply device according to claim 1, wherein the conversion unit includes a chopper circuit connected to the rectifier circuit, and
the control unit adjusts a duty ratio of a pulse signal output to the chopper circuit based on the information.
3. The wireless power supply device according to claim 2, wherein the conversion unit includes an inverter circuit connected to the chopper circuit, and
the control unit adjusts a duty ratio of a pulse signal output to the inverter circuit or a phase difference between respective phases of the pulse signal based on the information.
4. The wireless power supply device according to claim 1, wherein the communication unit acquires a voltage and a current relating to the load from the power-receiving device as the information.
5. The wireless power supply device according to claim 1, wherein the communication unit acquires the power supply impedance from the power-receiving device as the information.
6. The wireless power supply device according to claim 1, wherein the communication unit receives a charging voltage and a charging current of a battery which is the load from the power-receiving device as the information.
7. The wireless power supply device according to claim 6, wherein the control unit calculates the power supply impedance based on the charging voltage and the charging current, and controls the conversion unit based on the calculated power supply impedance so that the value of the power supply impedance falls within the predetermined range.
8. The wireless power supply device according to claim 6, wherein the control unit controls the conversion unit so that the power supply impedance is a lower limit value of the predetermined range in a first period, increases from the lower limit value within the predetermined range in a second period subsequent to the first period, and is an upper limit value of the predetermined range in a third period subsequent to the second period.
9. The wireless power supply device according to claim 8, wherein the control unit controls the conversion unit so that the power supplied to the battery is constant in the second period.

10. The wireless power supply device according to claim 8,
wherein the control unit controls the conversion unit so that the charging current of the battery is constant in the second period.

11. The wireless power supply device according to claim 6,
wherein the control unit controls the conversion unit so that the power supply impedance is a constant value within the predetermined range.

12. The wireless power supply device according to claim 1,
wherein the control unit controls the conversion unit based on the information such that a value of power supply impedance of the load falls within a predetermined range by functioning a power supply impedance control such that the power supply impedance becomes identical to a lower limit value within the predetermined range in a first period, by functioning both the power supply impedance control and a constant power control such that the power supply impedance increases from the lower limit value toward a value within the predetermined range in a second period subsequent to the first period, and by functioning the power supply impedance control such that the power supply impedance becomes identical to an upper limit value within the predetermined range in a third period subsequent to the second period.

13. A wireless power supply system comprising:
a power-supplying device; and
a power-receiving device;
wherein the power-supplying device comprises:
a first rectifier circuit to be connected to a commercial power source,
a conversion unit which is connected to the rectifier circuit,
a first resonance circuit which is connected to the conversion unit and transmits power wirelessly,
a first communication unit which receives information relating to power supply to a load supplied with power, and
a control unit which is connected to the communication unit and the conversion unit, and controls, in accordance with an order of a first control period in which a power supply impedance control functions with priority over a constant power control, a second control period in which the power supply impedance control and the constant power control both function, and a third control period in which the power supply impedance control functions with priority over the constant power control, the conversion unit based on the information such that a value of power supply impedance of the load falls within a predetermined range; and
wherein the power-receiving device comprises:
a second resonance circuit which receives the power wirelessly,
a second rectifier circuit which is connected to the second resonance circuit,
a measurement unit which measures the information relating to the power supply to the load, and
a second communication unit which is connected to the measurement unit, and outputs the information to the power-supplying device.

14. The wireless power supply system according to claim 13,
wherein the control unit controls the conversion unit based on the information such that a value of power supply impedance of the load falls within a predetermined range by functioning a power supply impedance control such that the power supply impedance becomes identical to a lower limit value within the predetermined range in a first period, by functioning both the power supply impedance control and a constant power control such that the power supply impedance increases from the lower limit value toward a value within the predetermined range in a second period subsequent to the first period, and by functioning the power supply impedance control such that the power supply impedance becomes identical to an upper limit value within the predetermined range in a third period subsequent to the second period.

* * * * *